(12) United States Patent
Pereira et al.

(10) Patent No.: US 11,006,506 B2
(45) Date of Patent: May 11, 2021

(54) SUPPLY UNIT FOR A BUS

(71) Applicant: TRIDONIC GMBH & CO KG, Dornbirn (AT)

(72) Inventors: Eduardo Pereira, Siebnen (CH); Ueli Keller, Uetliburg (CH); Urs Zingg, Schänis (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 583 days.

(21) Appl. No.: 15/754,400

(22) PCT Filed: Sep. 15, 2016

(86) PCT No.: PCT/EP2016/071832
§ 371 (c)(1),
(2) Date: Feb. 22, 2018

(87) PCT Pub. No.: WO2017/046248
PCT Pub. Date: Mar. 23, 2017

(65) Prior Publication Data
US 2018/0249557 A1 Aug. 30, 2018

(30) Foreign Application Priority Data

Sep. 17, 2015 (DE) .................... 10 2015 217 835.8
Jan. 29, 2016 (DE) .................... 10 2016 201 390.4

(51) Int. Cl.
*H05B 47/18* (2020.01)
*H04L 12/10* (2006.01)
(Continued)

(52) U.S. Cl.
CPC .............. *H05B 47/18* (2020.01); *G06F 1/26* (2013.01); *H04L 12/10* (2013.01); *H04L 12/4135* (2013.01); *H04L 12/4637* (2013.01)

(58) Field of Classification Search
CPC ....... H05B 47/18; G06F 1/26; H04L 12/4135; H04L 12/4637; H04L 12/10
See application file for complete search history.

(56) References Cited

U.S. PATENT DOCUMENTS

2012/0323399 A1* 12/2012 Hoffknecht ............... G06F 1/26
700/298
2014/0095749 A1   4/2014 Lambrechts
(Continued)

FOREIGN PATENT DOCUMENTS

DE       102013017019     4/2015
EP         0749070       12/1996
(Continued)

OTHER PUBLICATIONS

German Search Report in priority German Application 10 2015 217 835.8 dated Apr. 13, 2016.
(Continued)

*Primary Examiner* — Charles C Jiang
*Assistant Examiner* — Shawn D Miller
(74) *Attorney, Agent, or Firm* — Andrus Intellectual Property Law

(57) ABSTRACT

The invention relates to a bus node, which can be connected to a building services bus, which bus node comprises a supply unit and a control unit, wherein the supply unit is designed to output a measurement current onto the building services bus, and wherein the control unit is designed to sense and evaluate a bus current on the building services bus and, on the basis of the evaluation, to determine whether an operating current is output onto the building services bus by the supply unit.

12 Claims, 11 Drawing Sheets

(51) Int. Cl.
   *H04L 12/413*   (2006.01)
   *H04L 12/46*   (2006.01)
   *G06F 1/26*    (2006.01)

(56) References Cited

U.S. PATENT DOCUMENTS

2015/0145437 A1*  5/2015  Limmer ................. H05B 45/14
                                                     315/297
2017/0215256 A1*  7/2017  Abbattista .............. H05B 47/22

FOREIGN PATENT DOCUMENTS

| EP | 2739123    | 6/2014 |
| EP | 2770674    | 8/2014 |
| WO | 2015055290 | 4/2015 |

OTHER PUBLICATIONS

German Search report in priority German Application 10 2016 201 390.4 dated Sep. 26, 2016.
PCT Search Report in parent PCT Application PCT/EP2016/071832 dated Nov. 30, 2016.
Austria Search Report dated Mar. 16, 2020 in co-pending Austria Patent Application 3 GM 325/2015-1.

* cited by examiner

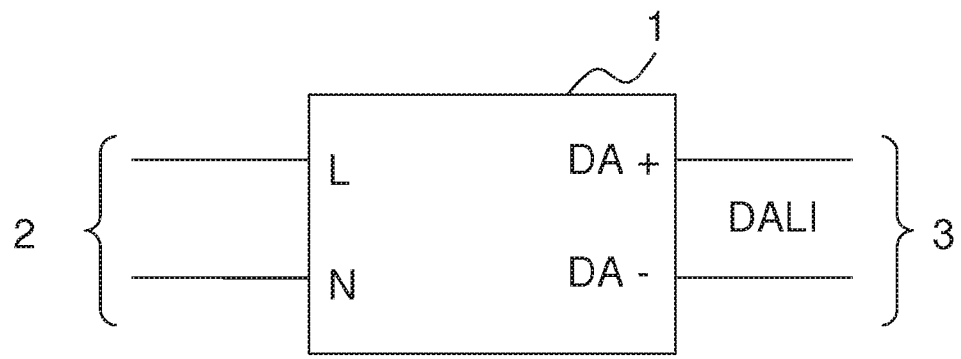
Fig. 1 - Prior Art
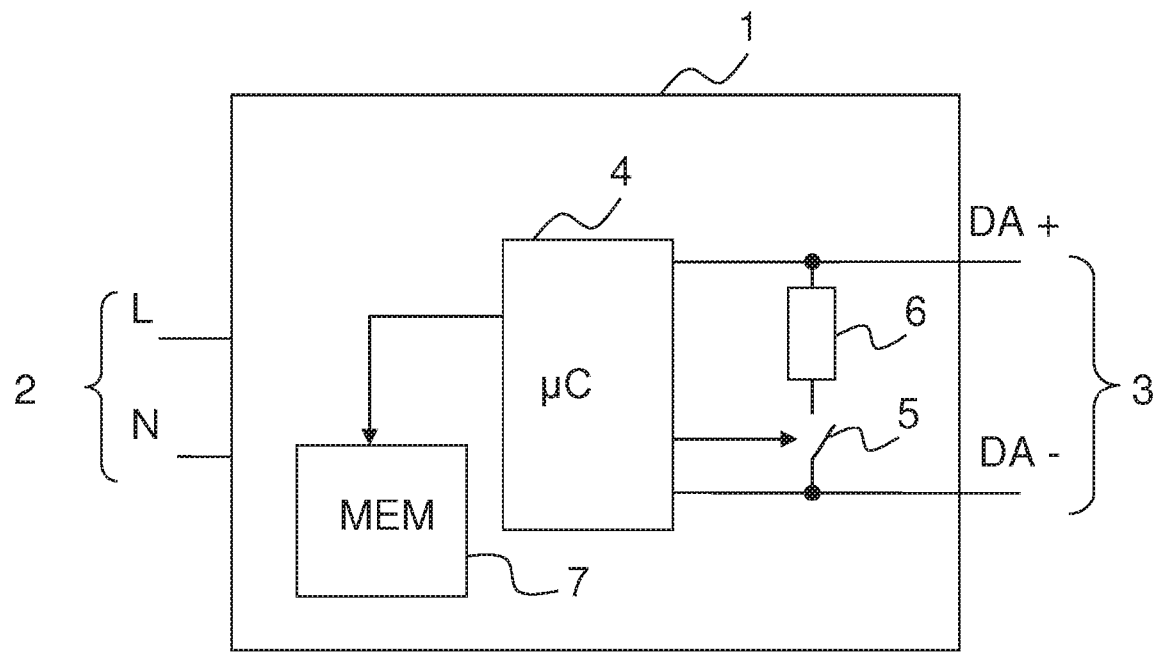
Fig. 2

SUPPLY UNIT FOR A BUS

CROSS REFERENCE TO RELATED APPLICATIONS

The present application is the U.S. national stage application of International Application PCT/EP2016/071832, filed Sep. 15, 2016, which international application was published on Mar. 23, 2017 as International Publication WO 2017/046248 A1. The International Application claims priority to German Patent Applications 10 2015 217 835.8 filed Sep. 17, 2015 and 10 2016 201 390.4 filed Jan. 29, 2016.

FIELD OF THE INVENTION

The invention relates to a process for operating a voltage supply system for a bus, preferably in a lighting system, a voltage supply system for a bus that conducts voltage in an idle mode that has at least two supply units connected in parallel, and a supply unit for a bus that conducts voltage in an idle state, wherein the supply unit is configured to supply bus subscribers with a DC voltage by means of the bus.

The lighting system preferably includes a bus, which is configured to conduct voltage in an idle state, and thus serves as a voltage supply for actuators and sensors in the lighting system. One example of such a bus is the Digital Addressable Lighting Interface (DALI) standardized in IEC 62386.

BACKGROUND OF THE INVENTION

DALI is a protocol for controlling lighting operating devices in building automation, switching power supply components, electronic ballasts, or electric dimmers, for controlling lamps, monitoring their operating states, and/or supplying the lamps with current.

Each operating device that has a DALI interface can be individually activated via corresponding DALI addresses, and can alter the intensity of a lamp or a sensor in the lighting system. Furthermore, there are actuators. A bidirectional data exchange between a DALI control device and a DALI device determines the status, for example, of a single lamp, or a group of lamps, or the operating device itself, and can furthermore control said element. DALI uses a serial asynchronous data protocol with a transfer rate of 1200 bit/s at a voltage of 16 V by means of dual wire communication.

The lighting system is supplied with energy via a separate bus. This involves two communication lines, DA+ and DA−, preferably galvanically separated from the mains supply, and without polarities. These two communication lines DA+ and DA− also serve as voltage supply lines. These lines can be laid out in any topology, thus in star, line, or hierarchical structures. Load resistors at the ends of the current supply lines are not necessary. The two communication lines, also serving as supply lines, shall be referred to hereinafter as a voltage conducting bus.

It can be derived from the DALI standard IEC 62386 that a maximum of 64 actuators per bus can be activated. The maximum current draw of the bus is limited to a predefined value, and is preferably 250 milliamperes, referred to hereinafter as the maximum current draw.

In order to ensure that the maximum current draw of 250 milliamperes from the bus is not exceeded, a special DALI supply unit is provided. This DALI supply unit generates a constant output current of a standard 200 milliamperes to 250 milliamperes with a voltage supply of 16 V when the lighting system is in the idle mode.

For a current draw higher than the predefined value for a maximum current draw, the bus subscribers connected to the bus are not configured such that the bus subscribers need to be protected against a current draw greater than the maximum current draw. In particular, it is not possible to connect numerous DALI supply units in parallel, because with a parallel connection, an output current to the bus would be generated that lies above the maximum current draw.

Moreover, it is provided in accordance with the DALI standard IEC 62389 that communication between two individual elements of the lighting system, hereinafter also referred to as bus subscribers, via the bus is impossible before a start-up procedure waiting time has elapsed. The DALI bus is only stable after this start-up procedure waiting time has elapsed, thus allowing communication between the bus subscribers. The start-up procedure waiting time is preferably 600 milliseconds.

Thus, if numerous DALI supply units are operated in parallel, a current flowing through the bus during this start-up procedure waiting time could exceed the maximum current draw, possibly resulting in overloads to the bus subscribers, thus damaging or destroying them.

Moreover, it is not possible to operate a DALI lighting element, e.g. a lamp or dimmer, or electronic ballast, in a DALI lighting system bus, independently of a DALI supply unit.

In planning lighting systems in buildings or building sections, there is a desire for a great deal of flexibility in the lighting system, among other things. It is thus desirable to install a number of smaller lighting systems, e.g., that have a low number of lamps, actuators and sensors. With this low number of elements, the maximum current draw of 250 milliamperes is never reached.

Alternatively or additionally, it is also desirable to cluster the bus in a flexible manner, thus connecting the bus subscribers to a first or second lighting sub-system in a very flexible manner, or to expand an existing lighting system in a flexible manner. Because a parallel connection of numerous DALI supply units is not provided for according to the DALI standard, a dedicated DALI supply unit must be provided for each conceivable cluster.

Comparably expensive DALI supply units are used in all of these design variations. When using such DALI supply units, the power supply for the bus in the lighting system is disadvantageously oversized and expensive to produce.

SUMMARY OF THE INVENTION

The problem addressed by the present invention is to thus create a voltage supply system and a supply unit that can be used specifically for smaller lighting applications, e.g. for operating less than ten actuators and sensors, which eliminates the aforementioned disadvantages. In particular, a lighting system should be supplied with energy in a very flexible manner, wherein the supply unit used for this should not be oversized, and should nevertheless comply with the DALI standard.

The problem is solved with the measures described in the coordinate independent claims. Advantageous designs are described in the respective dependent claims.

In a first aspect of the invention, a supply unit is proposed for a bus that conducts voltage in an idle state. The bus subscribers are supplied with a DC voltage by means of the bus, wherein a maximum current draw from the bus by the bus subscribers is limited to a predefined value. The supply unit has a circuit for this, which is configured to determine the current draw from the bus by bypassing the bus.

The detected current draw of the bus is thus determined by this circuit, such that an exceeding of the predefined value for the maximum current draw can be detected. Measures can thus be introduced for limiting the current draw or determining whether the supply unit can supply an additional current to the bus without exceeding the value.

The term "idle state" refers to a bus operating state in which only a voltage or current is conducted by the bus, and in particular, there is no data communication.

A "predefined value" is the maximum acceptable current in accordance with the DALI standard, for example. This value is stored, for example, in a storage unit of the supply unit, and can also be adapted to a respective, modified lighting system.

The supply unit circuit preferably includes a bypass switch for bypassing bus. Moreover, a control unit is provided in the supply unit circuit, wherein the control unit is configured to switch the bypass switch to a first switching state, in which the bus is bypassed, and switch the bypass switch to a second switching state, in which the bypass is deactivated. The control unit is furthermore configured to detect the current draw from the bus when the bypass switch is in the first switching state.

The bus is preferably a DALI standardized bus for a lighting system. The lighting system has at least one bus subscriber. The lighting system is preferably to be operated in accordance with the DALI standard IEC 62389.

An "element" in a lighting system is to be understood as a lamp, operating device for a lamp, a dimmer, an actuator, and/or a sensor for a lighting system.

The bus thus comprises two supply lines DA+ and DA−, which connects all of the bus subscribers connected to the supply unit in parallel. These supply lines are connected in parallel to each element of the lighting system with different topologies.

According to the invention, a bypass switch is provided in the supply unit for connecting the supply lines of the bus or for disconnecting an existing connection. A measurement element, for example, is located in the connection between the supply lines, preferably a current measuring resistor. The control unit for the circuit is configured for detecting a current by means of the measuring element, e.g. by detecting a voltage drop over the measuring resistor, which is converted in the control unit to a detected current draw.

In this manner, the bus supply unit can determine whether a current draw from the bus corresponds to a maximum current draw or even already exceeds this maximum. The supply unit provides no additional energy to the bus when the maximum current draw has been reached, or has already been exceeded.

In this manner, a modular supply system for the bus is obtained. The supply unit preferably has a maximum output current, which corresponds to a fraction of the maximum current draw for the bus. By way of example, the output current of the supply unit may be a tenth or a fifteenth of the maximum current draw. As a result, less expensive supply units may be used.

Numerous supply units can thus be connected in parallel in a voltage supply system, and it is always ensured thereby that the maximum current draw is not exceeded. A parallel connection thus offers the possibility of arbitrarily expanding or enlarging an energy supply for the bus, thus being able to supply other elements in the lighting system with power by connecting further supply units to the voltage supply system. A flexible clustering of the lighting system in a building or a building section is thus obtained.

In a preferred design, the supply unit can be operated in a master mode, in which the supply unit is the main supply for the bus. The supply unit can also be operated in a slave mode, in which the supply unit can serve as an auxiliary power supply for the bus, wherein the supply unit can be operated in the master mode or slave mode, depending on the detected current draw from the bus.

If there are numerous supply units in a voltage supply system, a main supply can be obtained from a first supply unit, wherein at least one further supply unit may be connected thereto if necessary, as long as the maximum current draw form the bus is not exceeded. The main supply is provided by the supply unit in the master mode. Only one supply unit is to be operated in master mode for each lighting system.

In a preferred design, the DC voltage or the output current of bus is provided when the bypass switch is in the second switching state. In this manner, it is ensured that the supply unit does not initially supply the bus with power, as long as the current draw from the bus has not been detected. The supply unit provides a supplementary output current to the bus when it has first been ensured that the supply does not exceed a maximum current draw. Thus, the bypass switch is switched independently of the provision of the energy supply.

In a preferred design, the supply unit comprises a voltage reduction and, optionally, rectification. Supply AC voltage is to be understood to mean a mains voltage of 230 V at 50 hertz, for example. Other standard mains supply values are not excluded from the concept of the invention.

In a preferred design, the control unit is configured to compare the current draw with the predefined value for a maximum current draw, wherein the supply unit is operated in the master mode if the predefined value is exceeded.

The control unit is preferably configured to first detect the current draw after an individual random waiting time has elapsed. As a result, the detection takes place at different times on the bus.

In a further aspect of the invention, a voltage supply system is provided for a bus that conducts voltage in an idle state, in particular for a lighting system. A maximum current draw from the bus by bus subscribers is limited to a predefined value. The bus voltage supply system comprises at least two supply units connected in parallel to the bus in accordance with the art described above, wherein each of the supply units is configured to supply bus subscribers with a DC voltage by means of the bus, wherein each of the supply units has a circuit that is configured to detect the current draw from the bus by bypassing the bus. The supply units of the bus are bypassed in order to determine the current draw.

Through selective bypassing, each current supply unit in the voltage supply system autonomously detects the current draw from the bus and decides on its own whether or not further energy can be supplied to the bus.

Each of the supply units preferably awaits completion of an individual random waiting period in an initializing phase, before the circuit detects the current draw of the bus.

It is preferably decided which of the supply units are to be operated as the main supply, and which are to be operated as the auxiliary supply in the voltage supply system in each supply unit on the basis of a comparison of the current draw and the predefined value for the maximum current draw from the buy by bus subscribers.

In accordance with the invention, the supply units are first operated as main supply units or auxiliary supply units after a preset start-up delay time in the initializing phase has elapsed. In this manner, it is ensured that a current draw detection is not carried out simultaneously by two supply units in the same lighting system. This prevents distortion of measurement results.

In a further aspect of the invention, a process for operating a voltage supply system according to the art described above shall be described. The process comprises the steps: initialization of the voltage supply system, wherein completion of an individual random waiting period is waited for in each of the supply units of the voltage supply system; detection of a current draw from the bus by bus subscribers through selective bypassing of the bus; operating the respective supply unit in either the master mode or a slave mode, wherein the mode is selected depending on the detected current draw from the bus; and evaluating a time period in which the bus is bypassed, wherein if a maximum bypass period is exceeded, the process begins anew.

The invention thus relates to an intelligent start-up process for a voltage supply to a bus, preferably in a lighting system. The process runs in particular before completion of the start-up delay, which is necessary for stabilizing the bus for data communication. A parallel connection of numerous supply units is thus obtained without any actual communication between the DALI components after a start-up period of 600 milliseconds has elapsed.

The supply units are configured as minimal supply units, such that their constant output current corresponds to a value of one tenth, e.g. 20 milliamperes, of the maximum current draw from the bus. In this manner, numerous supply units can be connected in parallel without exceeding the maximum current draw in the DALI lighting system. As a result, all of the elements of the lighting system are also protected against overloads during the start-up procedure.

The random waiting period in the process ensures that one of the supply units of the bus will qualify as the master supply unit. All of the other supply units are configured to detect the current draw from the bus after completion of the random waiting period, wherein a bypass switch of a control unit of the supply unit is enabled for this.

The detection preferably takes place after the supply unit detecting the current draw provides a DC voltage for the bus, wherein, when the predefined value for the maximum current draw is exceeded, the detecting supply unit deactivates its DC voltage supply for the bus. This deactivation protects the bus subscribers connected to the bus.

The detection is preferably repeated after the supply unit detecting the current draw has deactivated a DC voltage for the bus. If the current draw is still above the maximum current draw, the supply unit is then switched to the master mode. After a master mode waiting time has elapsed, a current draw detection is then repeated until the detected current draw lies below the maximum current draw.

The process for operating a supply unit in the slave mode preferably comprises the following steps: detection of a voltage value at the bus by the supply unit; renewed detection of the current draw from the bus if the detected voltage lies above a reference voltage; and operation of the supply unit in master mode if the renewed detection indicates that the detected current draw is above a predefined value for a maximum current draw from the bus by bus subscribers. A current draw detection is carried out in the master mode until the detected current draw is below the maximum current draw.

When the supply unit is in the slave mode, it is determined in this manner whether other supply units are connected to the bus.

In a preferred design, the slave mode comprises the further steps: waiting for completion of a master mode waiting period if the renewed detection indicates that the detected current draw is below a predefined value for a maximum current draw from the bus by bus subscribers; renewed detection of the voltage to the bus, wherein this supply unit is switched off when the renewed detection of the voltage indicates that the newly detected voltage is lower than the reference voltage. It is determined in this manner that a master supply unit is already connected to the bus.

In a preferred design, the current supply unit is operated in a master mode with the following steps: waiting for completion of a master mode waiting period; renewed detection of the current draw from the bus; deactivating the bypass of the bus if the renewed detection indicates that the detected current draw is lower than a predefined value for a maximum current draw from the bus by the bus subscribers.

A master mode waiting period is first allowed to elapse in this manner in order to ensure that the supply unit does not compete with a supply unit of the voltage supply system already being operated in the master mode. Each of the supply units operated in slave mode is deactivated during this waiting period if the detected current draw from the bus is above a maximum current draw, e.g. 250 mA. In this manner, a current overload is prevented.

The master mode of operation preferably comprises the following steps: detection of a voltage applied to the bus; waiting for a random waiting period to elapse if the detection indicates that the detected voltage is higher than a reference voltage; bypassing the bus; and a renewed detection of the current draw from the bus.

The method enables a quasi-communication between supply units connected in parallel in a voltage supply system, without actually having to wait for completion of a start-up procedure period before obtaining a stable data bus.

In a further aspect, a bus subscriber is provided that can be connected to a building technology bus, which has a supply unit and a control unit, wherein the supply unit is configured to output a measurement current to the building technology bus, and wherein the control unit is configured to detect and evaluate a bus current to the building technology bus, and to determine in the basis of the evaluation whether an operating current is output by the supply unit to the building technology bus.

The control unit can activate the supply unit in accordance with the evaluation to output the operating current, or deactivate a current output.

The control unit can determine the number of bus subscribers connected to the building technology bus in the evaluation on the basis of the detected bus current, and determine whether a total bus current that can be output by the determined number of bus subscribers lies within a bus specification.

The control unit can activate the supply unit in a test phase, in order to output the measured current to the building technology bus.

The control unit can activate the supply unit, in particular after the test phase, in order to output an operating current to the building technology bus when the total bus current that can be output by the determined number of bus subscribers lies within the bus specifications.

The control unit can deactivate the supply unit and/or the current output to the building technology bus by the supply unit when the total bus current that can be output by the determined number of bus subscribers does not lie within the bus specifications.

The control unit can determine whether the total bus current that can be output by the determined number of bus subscribers exceeds a threshold value, in particular 150-300 milliamperes, preferably 250 milliamperes, wherein the bus specifications comprise the threshold value.

The control unit can receive and evaluate a specific bus signal via the building technology bus, and start the test phase after receiving the specific bus signal, and activate the supply unit to output the measurement current.

The supply unit can generate the measurement current and/or the operating current, and output it to the building technology bus.

The control unit can detect the bus current at a random point in time, preferably within the test phase.

In a further aspect of the invention, a lamp is provided that has a bus subscriber like that described herein.

In a further aspect, a bus system for building technology devices, in particular a DALI bus system, is provided, which has a building technology bus, in particular a DALI bus, and at least two bus subscribers, preferably such as those described above, which are connected to the building technology bus, and each of which has a supply unit, wherein the supply units can be operated independently, wherein each of the bus subscribers is configured to output a measurement current from the respective supply unit to the building technology bus, and wherein the at least two bus subscribers are connected to the building technology bus in such a manner that applied measurement currents overlap, such that they are added to one another.

The bus subscribers can each have a control unit that detects and evaluates the bus current applied to the building technology bus, in particular within a test phase. The control unit can preferably be configured to determine the number of bus subscribers connected to the building technology bus on the basis of the detected bus current. These bus subscribers can preferably be those that contribute to the bus current. Other bus subscribers may also be present.

Each control unit can be configured to determine whether a threshold value for a total bus current has been exceeded on the basis of the determined number of bus subscribers, when the determined number of bus subscribers outputs an operating current to the building technology bus instead of the measurement current.

Each control unit can deactivate the supply unit and/or a current output by the supply unit to the building technology bus when the threshold value is exceeded.

The bus system can have a central current supply.

The threshold value for an acceptable total bus current can be defined at 150-300 milliamperes, in particular 250 milliamperes.

The independently operable decentralized supply units of the at least two bus subscribers can provide the total bus current.

In another aspect, a bus system for building technology devices is provided, in particular a DALI bus system, which has a building technology bus, in particular a DALI bus, at least two bus subscribers, preferably like those described above, and a decentralized current supply for the building technology bus, provided by at least two supply units of at least two bus subscribers, wherein the decentralized current supply is configured to output at least a total bus current proportionate to the number of bus subscribers to the building technology bus, and wherein each of the at least two bus subscribers has a control unit, which tests whether the total bus current that can be output by the supply units lies within a bus specification.

The control unit can be configured to deactivate a proportionate output of the total bus current by a bus subscriber of the at least two bus subscribers when the test indicates that the total bus current, including the proportionate output, does not lie within the bus specifications.

The at least one control unit can test whether the acceptable total bus current exceeds the bus specifications of 150-300 mA, in particular 250 milliamperes.

In another aspect, a process for operating a bus subscriber connected to a building technology bus is provided, wherein a supply unit outputs a measurement current to the building technology bus, and wherein a control unit detects and evaluates a bus current to the building technology bus, and determines whether an operating current is output to the building technology bus by the supply unit on the basis of the evaluation.

In a further aspect, a process is provided for operating building technology devices, in particular a DALI bus system, wherein at least two bus subscribers, preferably like those described above, are connected to a building technology bus and each have a supply unit, wherein the supply units are operated independently, wherein each of the bus subscribers outputs a measurement current generated by the respective supply unit to the building technology bus, and wherein the at least two bus subscribers are connected to the building technology bus such that the applied measurement currents overlap, particularly such that they are added to one another.

In another aspect, a process for operating building technology devices is provided, wherein a decentralized current supply for the building technology bus is provided by at least two supply units of at least two bus subscribers, preferably according to claim 1, wherein the decentralized current supply outputs at least a total bus current proportionate to the number of bus subscribers to the building technology bus, and wherein each of the at least two bus subscribers has a control unit, which tests whether the total bus current that can be output by the supply units lies within a bus specification.

The invention shall be explained below in greater detail on the basis of drawings of the invention and further embodiments and advantages of the invention, wherein the drawings only illustrate exemplary embodiments of the invention. Identical components in the drawings shall be provided with identical reference symbols. The drawings are not to be regarded as true to scale; some elements in the figures may be oversized, or simplified in terms of their depiction. Therein:

BRIEF DESCRIPTION OF THE DRAWINGS

FIG. 1 shows a supply unit according to the prior art.

FIG. 2 shows an exemplary embodiment of a supply unit according to the invention.

DETAILED DESCRIPTION

Figure 3:
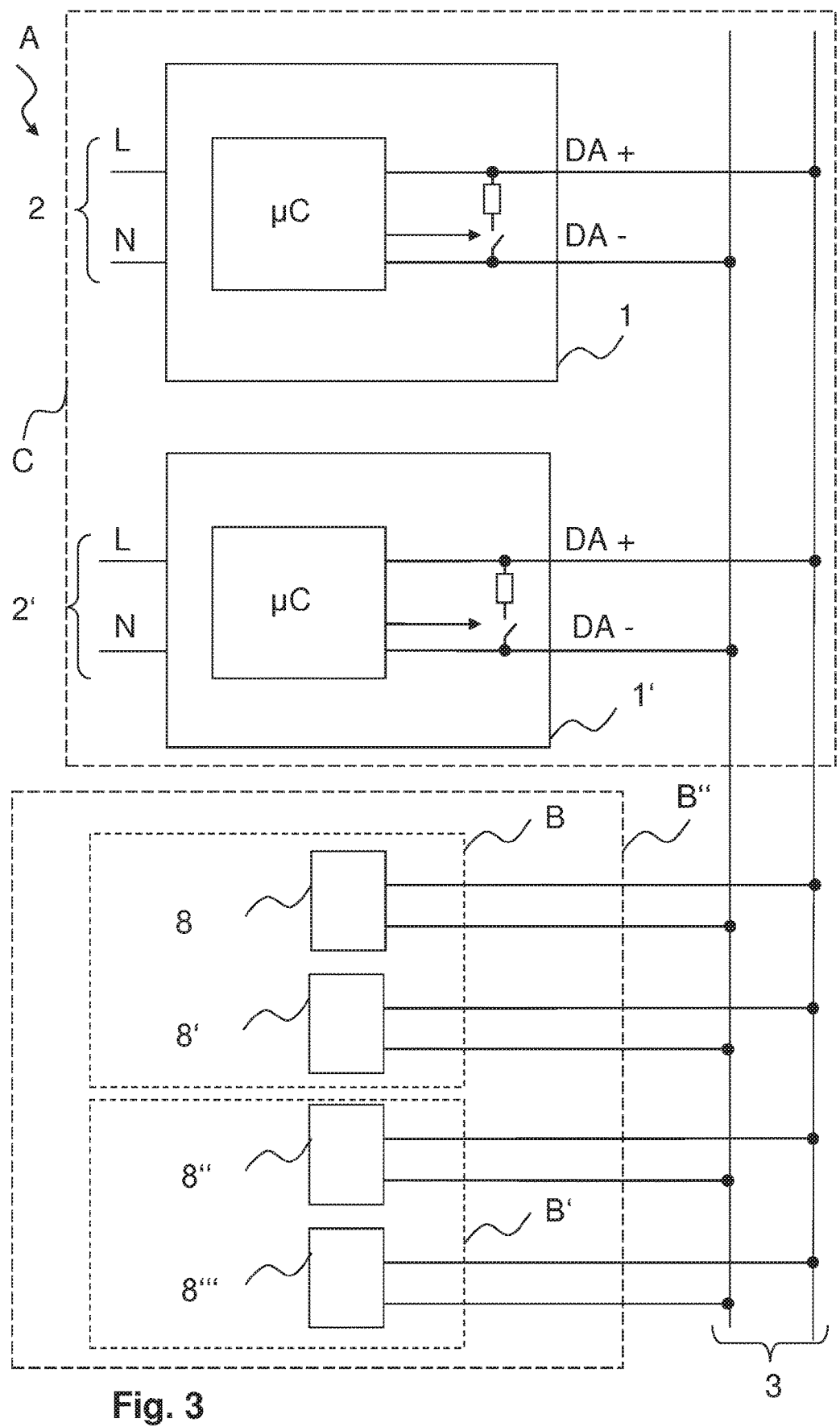
FIG. 3 shows an exemplary embodiment of a lighting system with a voltage supply system according to the invention.

A supply unit 1 according to the prior art is shown in FIG. 1. The supply unit 1 comprises input connections 2, shown as mains line L and the neutral line N. The invention does not exclude the use of a supply unit 1 that also has a protective conductor. The supply unit 1 also has a DALI interface, shown herein as bus 3, which has the lines DA+ and DA−. Such DALI supply units supply a bus 3 with a DC voltage, to which DALI operating devices, electronic ballasts, or dimmers, actuators or sensors, are connected as bus subscribers. The supply unit according to FIG. 1 is configured to supply the bus 3 with a current of 240 milliamperes. The supply unit is the only supply in a lighting system according to the prior art. A mains supply voltage of 220 volts to 240 volts is applied to the input connections 2. The mains supply voltage typically has a mains frequency of 50 hertz or 60 hertz. The supply unit is thus configured to output a power of 5 watts. The output voltage is 16 volts, with a tolerance of +/−5%. The DALI signal is not SELV.

In particular, such a DALI supply unit complies with the DALI standard IEC 62386.

The disadvantage with the existing DALI system is that it is not possible to connect such DALI supply units 1 in parallel, because the output current cannot exceed a maximum current draw of 250 milliamperes from the bus 3. Communication between the individual DALI supply units is not possible before a stabilized DALI data communication bus has been obtained, such that a later regulation of the DALI supply unit would not prevent the elements in the lighting system A from being operated with excessive current, which would result in damage to these elements, or the destruction thereof.

The DALI supply unit 1 according to the prior art is too large for numerous applications in lighting technology. A less expensive, modular and more flexible supply of current to the bus 3 for a minimalistic lighting system is therefore desirable.

Therefore, an alternative approach to supplying a bus with a DC voltage is proposed in accordance with the invention. This should also enable a quasi-communication between supply units 1 connected in parallel. The DALI standardized maximum current draw of a maximum of 240 mA is also not exceeded with the supply units proposed in accordance with the invention. An individual adaptation of existing DALI lighting systems is thus possible, wherein an individual clustering of the lighting system is then possible.

A supply unit 1 according to the invention is shown in FIG. 2. In addition to the connections 2, 3 shown in FIG. 1, a control unit 4 is provided according to the invention in the supply unit 1. The control unit 4 is configured as a microcontroller, ASIC, FPGA or CPLD, for example. The control unit 4 is connected to the bus 3. A bypass switch 5 is also provided in the supply unit 1. The bypass switch 5 is provided for bypassing the bus 3. For this, the bypass switch 5 has a first switching state I, for connecting the lines DA+ and DA− to one another. In a second switching state II, the bypass switch 5 disconnects the current supply lines DA+ and DA− from one another. The control unit 4 causes the switching of the switching states of the bypass switch 5. A switching signal is generated by the control unit 4 for this. A current draw from the bus 3, which flows through the supply lines DA+ and DA−, can then be detected by means of the bypass switch 5. A measurement element 6 is provided for this in the connection between the supply lines DA+, DA−. The control unit 4 is provided for detecting a current drop over a measurement 6, configured as a current measurement resistor, for example, when the bypass switch 5 is activated. Alternatively, the measurement element 6 establishes a galvanic coupling, e.g. by means of coupled coils, or alternatively by means of an optocoupler. The detected current draw from the bus 3 is evaluated in the control unit 4. Depending on the current value, and in comparison with a predefined value $I_x$ for a maximum current draw, e.g. 240 mA according to the DALI standard IEC 62389, a power supply is then provided to the bus 3 by the supply unit 3, and the switch 5 is deactivated, or the power supply is not provided, and the switch 5 is deactivated.

A storage element 7 is provided according to the invention in the supply unit 1. DALI addresses, DALI lighting groups, DALI lighting scenarios, and/or dimmer values are stored in this storage element 7, which are provided for a specific setting of the lighting system A. When operating device 8 in the lighting system is replaced, the lighting system can then be set by means of the memory 7. All of the relevant data for the elements 8 connected to the lighting system A can thus be stored in the memory 7. These data thus serve as back-up data if operating devices need to be replaced in the lighting system.

In this manner, fundamental functionalities, e.g. firmware settings or regulations can also be stored in the memory 7. If an operating device is replaced, these data are downloaded from the memory, and are immediately available in the lighting system without elaborate initialization or installation processes. Additional functions such as dimming, group lighting, and emergency lighting scenarios can also be contained in the memory 7.

A lighting system A according to the invention is shown in FIG. 3. The lighting system A comprises a voltage supply system C, composed of a first supply unit 1 and a second supply unit 1', as is shown, by way of example, in FIG. 2. The bus 3 supplies the elements 8, 8', 8", and 8''' with a DC voltage from the supply units 1, 1'. Elements 8, 8', 8", and 8''' are operating devices for lamps or dimmers or electronic ballasts or sensor elements, or operating devices for actuators in the lighting system A.

The lighting system A according to FIG. 3 is DALI standardized. The lighting system A is a comparatively small lighting system A, because only four elements are operated therewith. These four lighting elements 8, 8', 8", and 8''' can then be interconnected in different patterns, and operated in different clusters. By way of example, a cluster B could be composed of two elements 8 and 8'. Such a small cluster B can be operated by means of one of the two supply units 1, 1'. A further cluster B' can be composed of the elements 8" and 8''', and can also be supplied with current by one of the supply units 1, 1'. By way of example, a third cluster B" can also be formed in which all four lighting elements 8, 8', 8'', and 8''' are to be operated simultaneously in the lighting system A. In such a cluster B'', at least two supply units 1, 1' must be provided in order to generate the necessary current.

The clustering takes place, for example, during the installation or planning of the lighting system A. In order not to have to specify the clustering at such an early stage, a flexible, modular and modifiable structure can be obtained by means of supply units 1, 1' that can be connected in parallel.

The number of supply units 1, elements 8, and clusters B, is merely exemplary, and not limited to the numbers given, according to the invention.

In order to be able to operate this lighting system A according to the DALI standard, it must be ensured that the current draw never exceeds a predefined value $I_x$ for a maximum current draw, but that all of the elements 8 are supplied with sufficient power. It must also be ensured that the supply is provided within the waiting period of 600 milliseconds. This is enabled by a process for operating the voltage supply system C, as is depicted by way of example in FIGS. 4 to 8.

Figure 9:
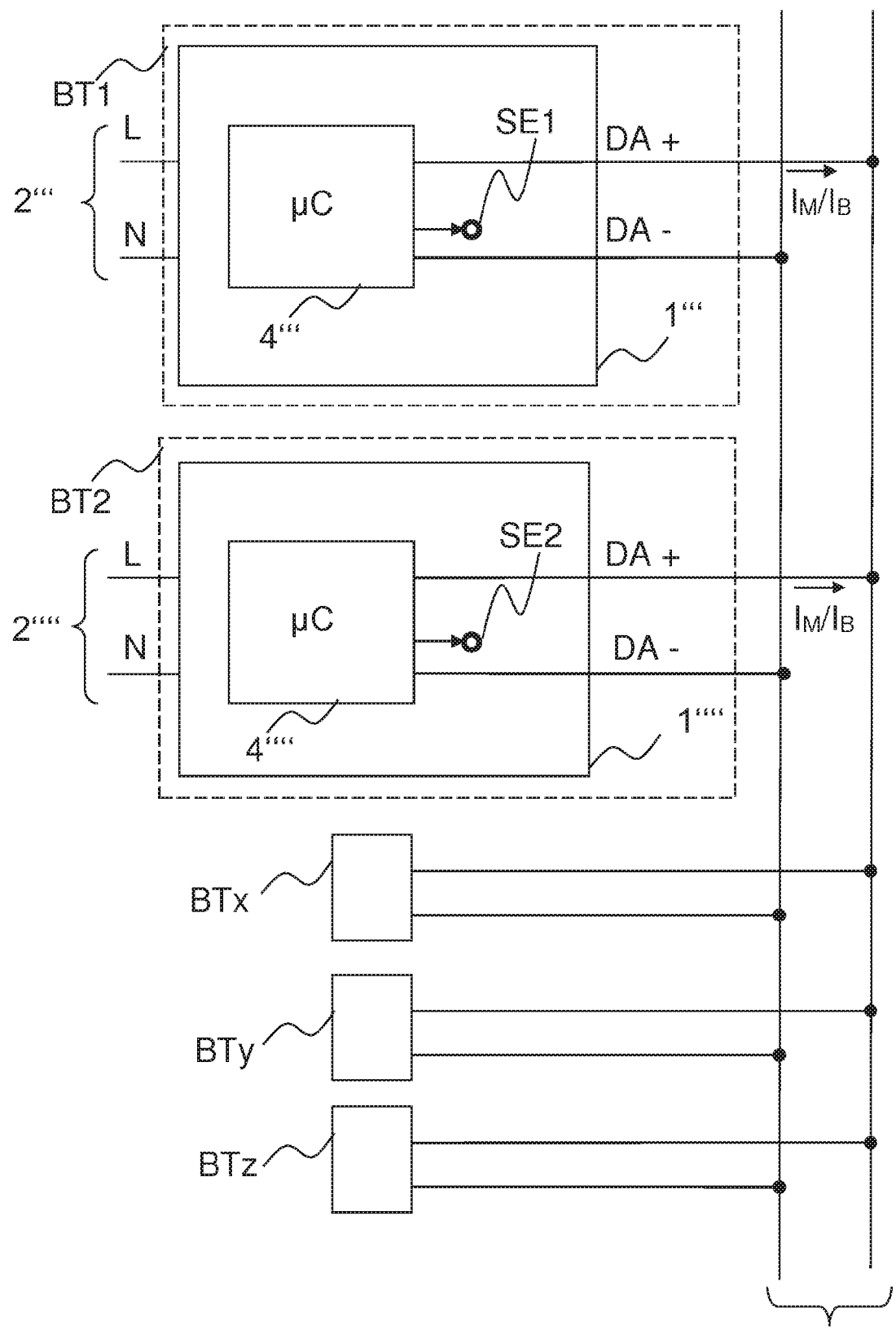
FIG. 9 shows another exemplary embodiment of a lighting system with a voltage supply system according to the invention.

A further exemplary embodiment of a lighting system is shown in FIG. 9, which has supply units 1''', 1'''' connected in parallel. The supply units 1''', 1'''' are each preferably disposed inside a bus subscriber BT1, BT2 here. Other bus subscribers BTx, BTy, BTz, which may differ from the bus subscribers BT1, BT2, and in particular do not need to include a supply unit, are likewise shown in FIG. 9.

The supply units 1''', 1'''' are also supplied via the input connections 2''', 2'''', and connected to a bus 3'''. As illustrated, a control unit 4''', 4'''' is provided in each of the bus subscribers, each of which can activate the supply units 1''', 1'''', respectively. An activation signal, for example, can be output at a control input SE1 or SE2 of the supply units 1''', 1'''' by the respective control unit 4''', 4''.

According to the exemplary embodiment in FIG. 9, the bus 3''' is then supplied with electricity by the at least two supply units 1''', 1'''' of the at least two bus subscribers BT1, BT2, which function as decentralized, independent current supplies. It is understood thereby that other bus subscribers BTx, BTy, BTz can also be configured in a manner analogous to the bus subscribers BT1, BT2, such that the decentralized, independent current supply comprises more than the supply units 1''', 1''''. The supply units 1''', 1'''' of the at least two bus subscribers BT1, BT2 then supply current to the bus 3''', such that the current supply no longer needs to take place centrally, through a correspondingly sized central bus supply unit.

The supply units 1''', 1'''' can therefore be smaller than the central bus supply unit. The supply units 1''', 1'''' can also be assigned to the bus subscribers in another manner. A bus subscriber can thus not include a supply unit 1''', 1'''', while another bus subscriber can include more than one supply unit 1''', 1''''.

Another incentive for the decentralized current supply is that a central bus supply unit is relatively expensive, and is only justified when used with a large number of bus subscribers. With a small number of bus subscribers, it is more economical to use smaller and less expensive current supplies, as mentioned in the introductory portion of this application.

The bus system illustrated in FIG. 9 is thus equipped with at least two supply units 1''', 1'''', which create the decentralized current supply. The bus subscribers BT1, BT2 and/or the supply units 1''', 1'''' are preferably disposed such that the currents that are supplied to the bus 3''' can be superimposed to form a total bus current.

The bus subscribers BT1, BT2 that provide the decentralized current supply for the bus 3''', which is preferably a building technology bus, can exhibit an intelligence in the form of control units 4''', 4'''' (preferably IC, ASIC or microcontrollers (µC)). The bus subscribers BT1, BT2 can thus each test whether the resulting total bus current to the bus 3''' and in particular an expected total bus current falls within a bus specification, in particular a DALI bus specification. This means, e.g., that the control unit 4''', 4'''' tests whether a threshold value for a current, e.g. a threshold value for a maximum acceptable total bus current of, e.g. 150 to 350 milliamperes, preferably 250 milliamperes, has been exceeded when the at least two supply units 1''', 1'''' output an operating current, in addition to or instead of a measurement current, to the bus 3'''.

If it has been determined that the threshold value has been reached or exceeded, thus exceeding the acceptable total bus current, the intelligence, i.e. the control units 4''', 4'''' in the bus subscribers BT1, BT2, takes measures for reducing the ultimately resulting total bus current.

In a specific configuration, the intelligence tests the bus current applied to the bus 3''' in a training or test phase. This means that at least one of the control units 4''', 4'''' detects and evaluates the current applied to the bus 3''' in a defined time period, which begins, e.g. when the control units 4''', 4'''' receive a signal, and has a predefined length (e.g. stored in a memory accessible to the control unit 4''', 4''''). Each bus subscriber BT1, BT2 determines whether the contribution of its respective decentralized supply unit 1''', 1'''' is necessary regarding the maximum total bus current.

The sequence is preferably:

Each bus subscriber BT1, BT2 that has a decentralized current supply has at least one current source, e.g. in a supply unit 1''', 1'''', which can deliver a constant current at at least two different current levels.

A first current level output by the supply unit 1''', 1'''' is a measurement current $I_M$. This measurement current $I_M$ is output by the supply units 1''', 1'''' in the test phase. This measurement current $I_M$ can be relatively low, e.g. 10-25 milliamperes.

Each bus subscriber BT1, BT2 is assigned to a point in time, e.g. by a (local) pseudo-random generator, at which it tests/measures the total current capacity currently available at the bus 3'''. The bus subscribers BT1, BT2 can form a maximum load to the bus 3''' for this. The bus subscriber BT1, BT2, or the control unit 4''', 4'''' can then detect which current is applied to the bus 3'''. It is important during the test phase that the respective bus subscriber BT1, BT2, or the supply units 1''', 1'''' only activate the current source that outputs the measurement current $I_M$, thus, that which supplies the lower constant current (e.g. 10 mA, in comparison with 50 mA in, e.g., a total current maximum load of 250 mA).

When a bus subscriber BT1, BT2 tests which total bus current is being employed, it can determine, when the level of the measurement current $I_M$ is known, the number of decentralized current supplies, or bus subscribers BT1, BT2 outputting a measurement current $I_M$ to the bus 3'''. The bus subscriber BT1, BT2 can then conclude whether a bus current set by the bus 3''' lies within or beyond the bus specifications, in particular the DALI specifications when a second, larger and/or additional current source is activated, which provides an operating current $I_B$. The bus subscriber knows which operating current is output by each bus subscriber BT1, BT2. The larger current source alternatively or additionally delivers the operating current $I_B$, which can preferably be 10-70 milliamperes, and ideally can be 15, 25, 40, 50, 65, 75, 90, 105, 125 or 140 milliamperes.

It can thus be concluded whether the bus subscriber that is currently assessing/measuring/testing must actually deliver a contribution with the decentralized current supply. If this is not the case, the testing bus subscriber BS1, BS2 shuts off, or deactivates the output of a current provided by the supply unit 1''', 1'''' to the bus 3'''.

After all of the bus subscribers BT1, BT2 have completed the test phase, the bus system is configured, and if applicable, only a sub-group of the bus subscribers BT1, BT2 output their operating current $I_B$ with the decentralized current supply after the test phase when actually in operation.

After completion of the training phase, all of the bus subscribers BT1, BT2 that have determined that they must deliver a contribution each activate the operating current $I_B$, and a total current is obtained that lies in the acceptable range of the total current. The operating current $I_B$ can be output alternatively to or in addition to the measurement current $I_M$.

It is also possible to repeat the test phase, e.g. if certain bus parameters are lacking that are prerequisites for the measurement. The starting point for the test phase does not need to be defined by the bus subscribers BT1, BT2, e.g. it can be defined externally, by a bus signal from a bus master. The test phase can also be initiated automatically by the bus subscribers BT1, BT2, e.g. starting after a predetermined point in time, or within a predetermined time period, starting when the bus subscriber BT1, BT2 is supplied with a supply voltage.

Figure 10:
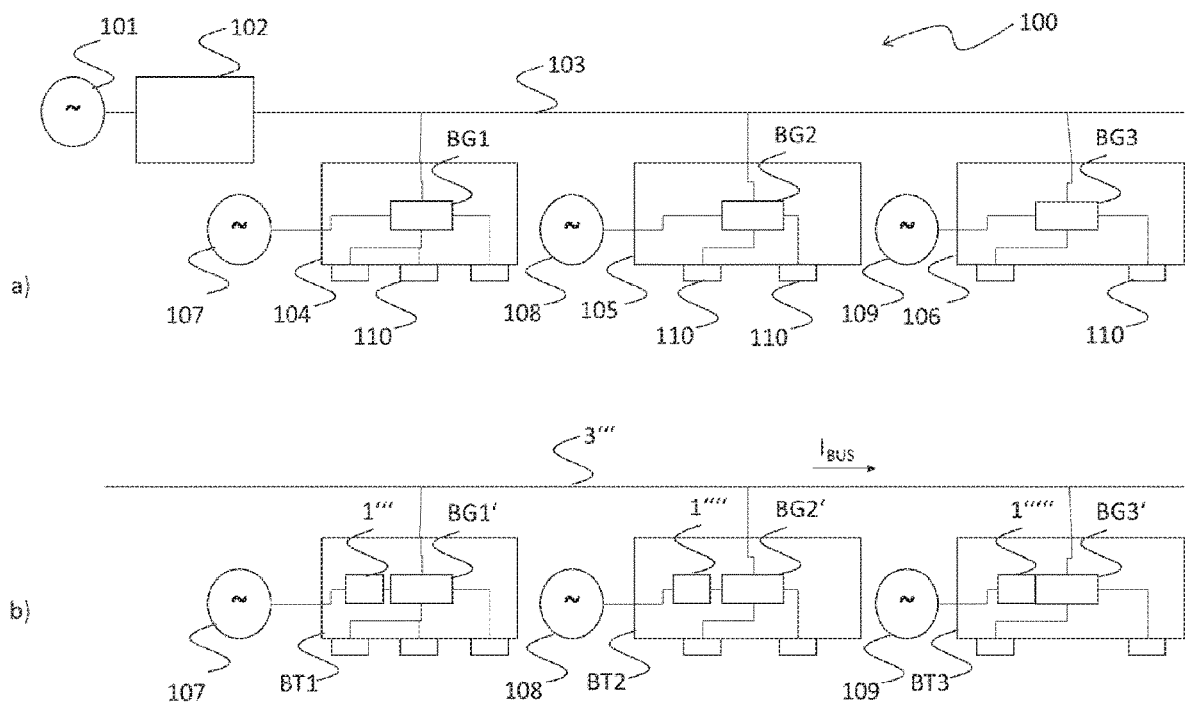
FIGS. 10a and 10b shows another exemplary embodiment of a lighting system with a voltage supply system according to the invention.

A lighting system 100 is shown In FIG. 10a for a better comparison with a lighting system according to the prior art. A bus supply unit 102 is supplied with power by a supply voltage source 101, in particular an AC voltage. The bus supply unit 102 supplies the bus 103 with the bus voltage, or bus current $I_{BUS}$. The bus supply unit 102 is configured specifically for supplying the bus 103, and in particular, is configured as a DALI bus supply unit.

Moreover, bus subscribers 104, 105, 106 are shown, each of which can likewise be supplied with power by a voltage supply 107, 108, 109. The voltage supplies 107, 108, 109 operate the bus subscribers 104, 105, 106, and are used for operating bus subscribers, e.g. equipment 110 such as lamps, sensors, actuators, etc. Each of the bus subscribers 104, 105, 106 has an operating device BG1, BG2, BG3, which converts the supply voltage supplied by the voltage supplies 107, 108, 109 for the corresponding equipment 110, and can also communicate with the bus 103 in order to receive commands transmitted by the bus 103, and activate the equipment 110 accordingly.

FIG. 10b, by comparison, shows a design according to the further exemplary embodiment of the invention shown in FIG. 9, in which the bus subscribers BT1, BT2, and an additional bus subscriber BT3, are supplied with power by a voltage supply 107, 108, 109, wherein the bus subscribers BT1, B2, BT3 each have, in addition to operating devices BG1', BG2', BG3', a supply unit 1''', 1'''', 1''''', which then supply the bus 3'''. A central bus supply unit 102 is thus unnecessary for supplying the bus 3''' with power. The main reason for this configuration is that, as stated above, the costs for bus systems increase quickly due to the bus supply unit 102, when the bus system is small. Furthermore, the central bus supply unit 102 must also be wired accordingly. The central bus supply unit 102 normally provides a current source for this, which has a maximum output of 250 mA.

In the configuration shown in FIG. 10b, each bus subscriber BT1, BT2, BT3 has its own supply unit 1''', 1'''', 1''''', each of which can output an operating current $I_B$ to the bus 3'''. If numerous bus subscribers BT1, BT2, BT3 with such supply units 1''', 1'''', 1''''' are then added to the system and connected to the bus 3''', they can collectively output their operating currents $I_B$ to the bus 3''', or they can detect the bus current $I_{BUS}$ at the bus 3''', and adjust their own contribution to the total bus current.

The fundamental idea is thus to determine The measurement current $I_M$ output by the bus subscribers BT1, BT2, BT3 (only) during the test phase has a predefined level. Thus, by way of example, a total bus current of 100 mA can be output to the bus 3''', and detected by a bus subscriber BT1, BT2, BT3, when the measurement current is 10 mA, and 10 bus subscribers are connected to the bus 3'''. If a bus subscriber BT1, BT2, BT3 then determines that a bus current of 10 mA is applied to the bus, the control unit 4''', 4'''' of the bus subscriber BT1, BT2, BT3 can then determine that with a respective measurement current $I_M$ of 10 mA, 10 bus subscribers BT1, BT2, BT3 can participate in the decentralized current supply.

during the test or training phase, what current is available at the bus 3'''. The bus subscribers BT1, BT2, BT3, or their control units 4''', 4'''' thus detect the current applied to the bus 3''' within the test phase, and can decide on the basis of this, whether they will output the operating current $I_B$ by means of their own supply units 1''', 1'''', 1''''', thus increasing the current feed to the bus 3'''.

The bus subscriber BT1, BT2, BT3 detects the bus current $I_{BUS}$ applied to the bus 3''' within the test phase at a random point in time. In particular, the bus subscriber BT1, BT2, BT3 can have a (not shown) random generator, which establishes the random point in time within the test phase or training phase. It is also possible for a randomly generated number to be stored in the bus subscriber BT1, BT2, BT3, which defines a point in time within the test phase. In particular, each bus subscriber BT1, BT2, BT3 can detect the start of the test phase in that, for example, a specific signal is received via the bus 3''', indicating the start of the test phase. This signal can be transmitted in particular by a bus master.

If the bus subscriber BT1, BT2, BT3 then detects a current applied to the bus 3''', it knows that when all of the bus subscribers were to output an operating current $I_B$ of, e.g., 50 mA to the bus, this would violate the bus specifications. These specify, e.g., that only 250 mA are to be applied to the bus 3''' according to the DALI standard. In this regard, the bus specification has at least one threshold value for the maximum acceptable total bus current. If each of the bus subscribers BT1, BT2, BT3 were to output an operating current $I_B$ of 50 mA to the bus, this would result in a bus current of 500 mA. In order to avoid this, the bus subscriber BT1, BT2, BT3 adjusts its current output to the bus 3'''.

Thus, another bus subscriber BT1, BT2, BT3, e.g. bus subscriber BT2, can then detect a bus current of 90 mA to the bus at another random point in time, and thus likewise determine that with new bus subscribers, the bus specification would be violated by the operating current output to the bus following the test phase.

This process is then carried out until, e.g., a bus subscriber BTx has determined that there is only a bus current of, e.g. 50 mA or less at the bus. If this is the case, the bus subscriber BTx determines that with an output of the operating current $I_B$ after the test phase by all of the remaining bus subscribers, a bus specification will not be violated, because with a respective operating current of 50 mA, the threshold value for the maximum total bus current of 250 mA is not exceeded.

It should also be noted that the supply units of the bus subscribers can also be integrated in operating device of the bus subscribers. This has been depicted for bus subscriber BT3.

Figure 11:
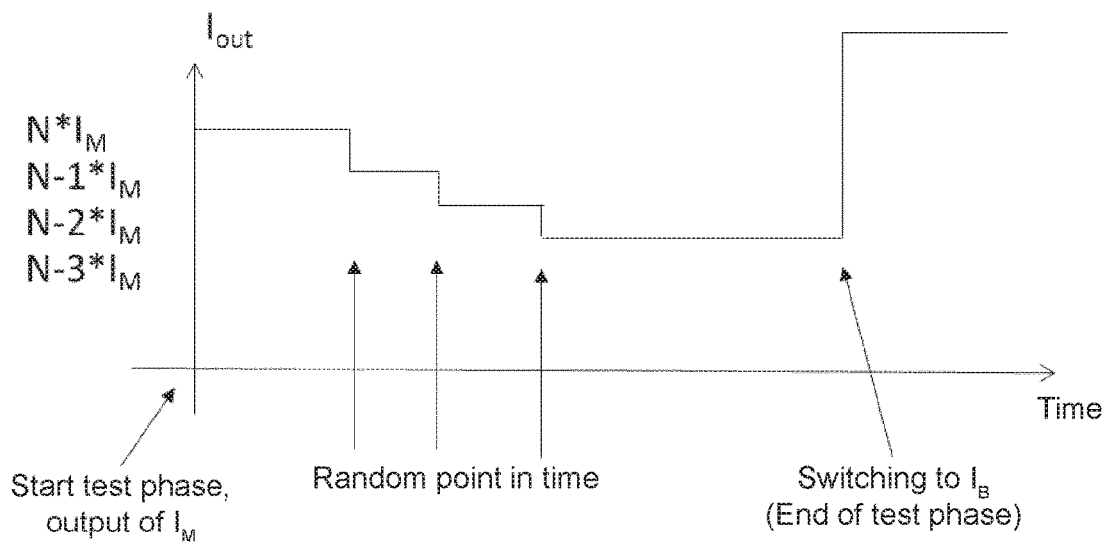
FIG. 11 shows, schematically, how a part of a supply unit is utilized in the further exemplary embodiment.

The process is also illustrated in FIG. 11. It can be seen herein that in the test phase, first all bus subscribers with a supply unit output the measurement current $I_M$ to the bus, such that there is first a current $I_{BUS}$ at the bus 3''' that corresponds to the measurement current $I_M$ multiplied by the number of bus subscribers N. As explained above, it is then checked by the bus subscriber, at a random point in time, whether or not it should provide an operating current after the test phase. If this is not the case, it no longer outputs a measurement current $I_M$ to the bus 3'''. This results in a drop in the bus current $I_{BUS}$.

A bus subscriber testing at another point in time would thus detect a modified bus current $I_{BUS}$, and the control unit of the bus subscriber would then carry out the evaluation on the basis of the modified bus current $I_{BUS}$. Lastly, at least one bus subscriber determines that the remaining number of bus subscribers, e.g. N–3, can each output an operating current $I_B$ to the bus 3''', without violating the bus specifications, or exceeding the threshold value for the maximum total bus current. After completion of the test phase, these remaining bus subscribers then each make their operating current $I_B$ available to the bus 3''', such that the bus current $I_{BUS}$ increases as a whole to the extent of the superimposed, and summed operating currents, e.g. N–3*$I_B$.

Figure 12:
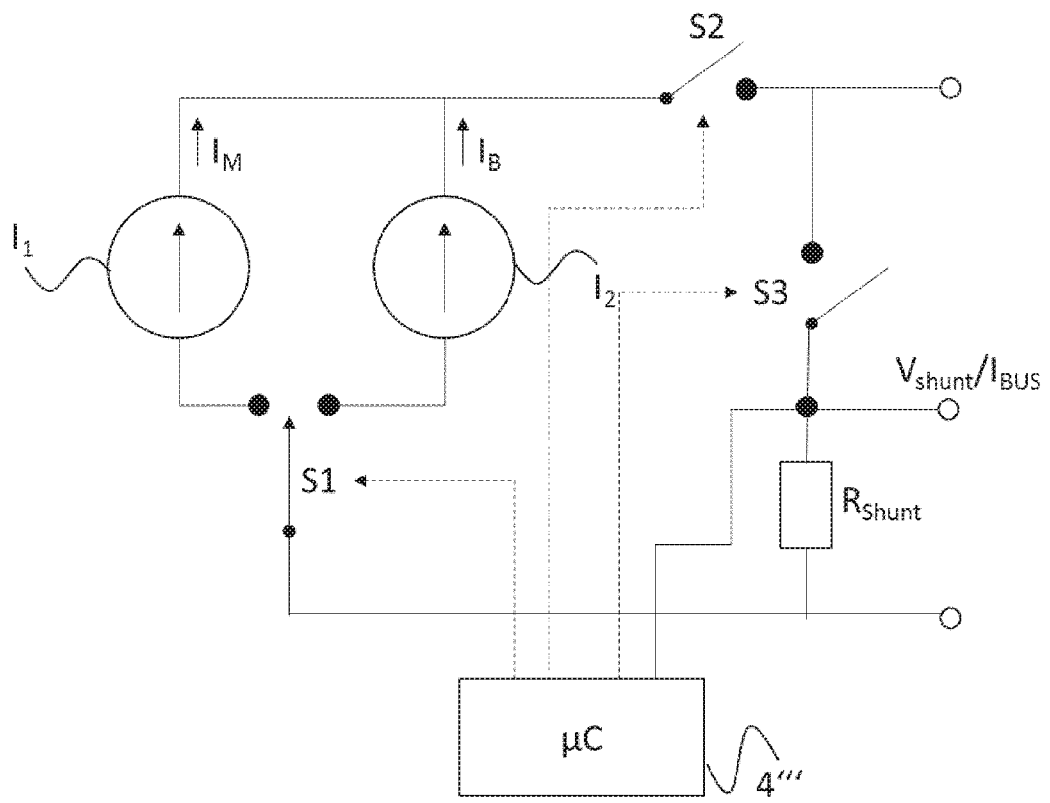
FIG. 12 shows a process, as it is described in reference to FIG. 9.

A concrete design for a supply unit 1''', 1'''' is shown schematically in FIG. 12. In particular, the supply unit 1''' has a first current source $I_1$ and a second current source $I_2$. The first current source $I_1$ can provide the measurement current $I_M$, for example, while the second current source $I_2$ can provide the operating current $I_B$. Switches S1, S2, S3 are likewise shown, which are activated by the control unit 4'''. A measuring resistor $R_{Shunt}$ is connected in series to the switch S3, with which the control unit 4''' can detect a voltage $V_{Shunt}$.

At the start of the test phase, switch S2 is activated, and switch S1 is connected to the current source $I_1$, such that the current source $I_1$ outputs the measurement current $I_M$ to the bus 3'''. After a random period, which can be established by a random generator, as explained above, switch S3 is activated, and a voltage that reflects the current at the bus, or a current, is measured at the measuring resistor $R_{Shunt}$. Because all of the bus subscribers output the same measurement current $I_M$ to the bus, the detected bus current thus corresponds to a multiple of a measurement current $I_M$, and the number of bus subscribers can therefore be determined. If the maximum number of bus subscribers is exceeded, i.e. the number of bus subscribers that can output an operating current $I_B$ to the bus without violating the bus specifications is exceeded, switch S2 is deactivated, and the current sources $I_1$, $I_2$ are deactivated.

Otherwise, switch S2 remains active, and after a predetermined period, i.e. after the test phase, switch S1 is switched to the current source $I_2$, thus outputting an operating current $I_B$ to the bus.

As a matter of course, the test phase can also be automated, e.g. taking place after a predetermined period following the initiation of a current supply by the bus subscribers.

Figure 13:
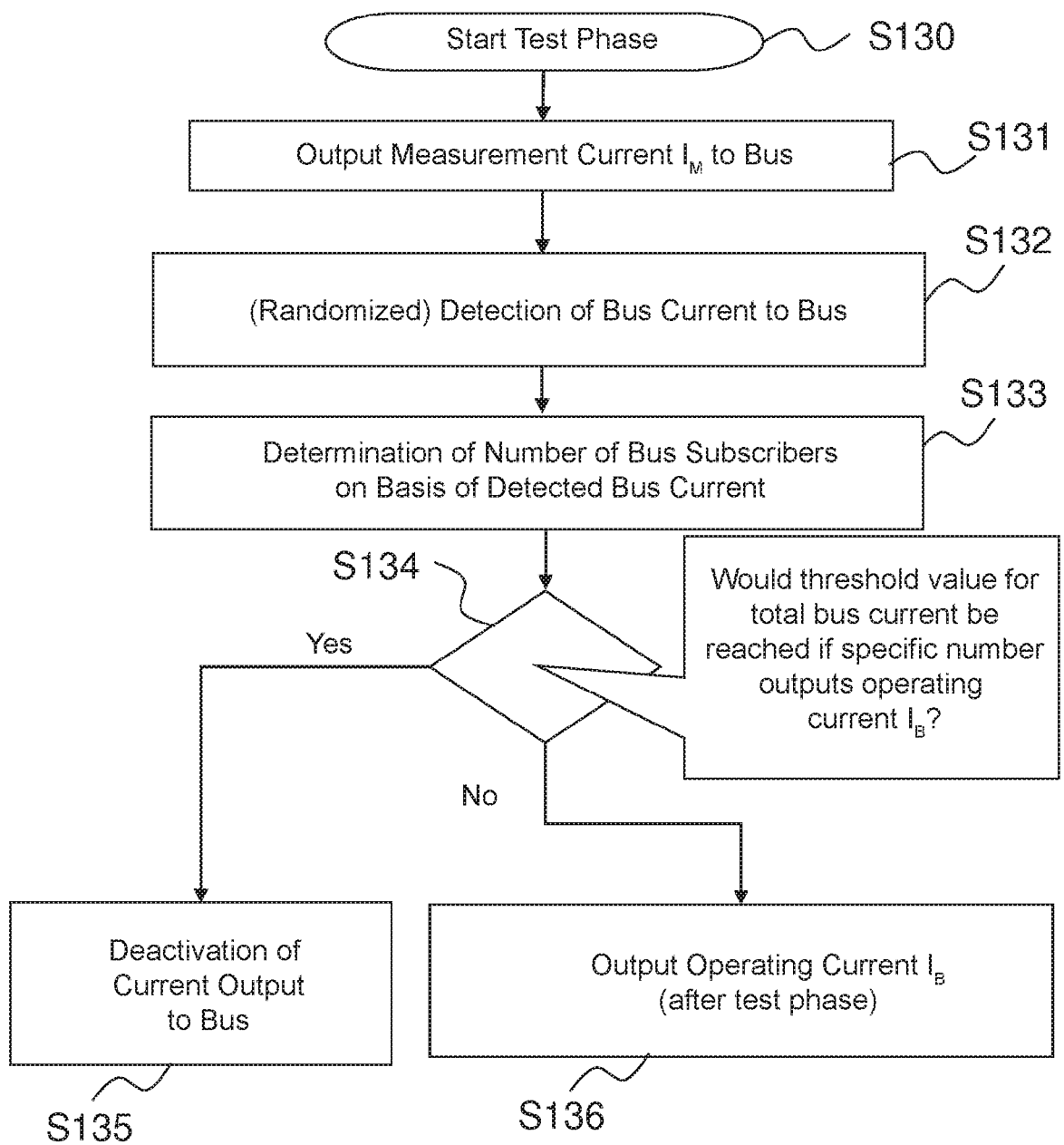
FIG. 13 shows, schematically and by way of example, a process sequence in accordance with the further exemplary embodiment, in the form of a flow chart.

The process carried out by a bus subscriber according to the invention is shown in a flow chart in FIG. 13.

The test phase starts in step S130. The start of the test phase can be indicated by a bus signal, as explained above, or it can start after a specific time following the voltage supply to the bus subscriber that has been stored in the bus subscriber. The length of the test phase in particular is also stored in the bus subscriber.

In step S131, the supply unit 1''', 1'''' outputs the measurement current $I_M$ to the bus 3'''.

The control unit then detects the bus current $I_{BUS}$ applied to the bus 3''' in step S132, at a random point in time $t_{Rend}$, preferably lying between 0 and 65.5 ms after the start of the test phase.

In step S133, the control unit 4''' determines the number of bus subscribers connected to the bus 3''' on the basis of the detected bus current $I_{BUS}$. In step S134, the control unit 4''' of the bus subscriber then determines whether a threshold value for the total bus current has been reached on the basis of the determined number or the detected bus current $I_{BUS}$, if all of the bus subscribers in the determined number were to output the operating current $I_B$. The threshold value thus represents a criterion, according to which it is determined whether the bus specifications have been violated.

If the bus specifications have been violated, or a violation thereof occurs, the bus subscriber deactivates a current output to the bus 3''' in step S135.

Otherwise, the bus subscriber switches to outputting the operating current $I_B$ in step S136 after completion of the test phase.

Figure 4:
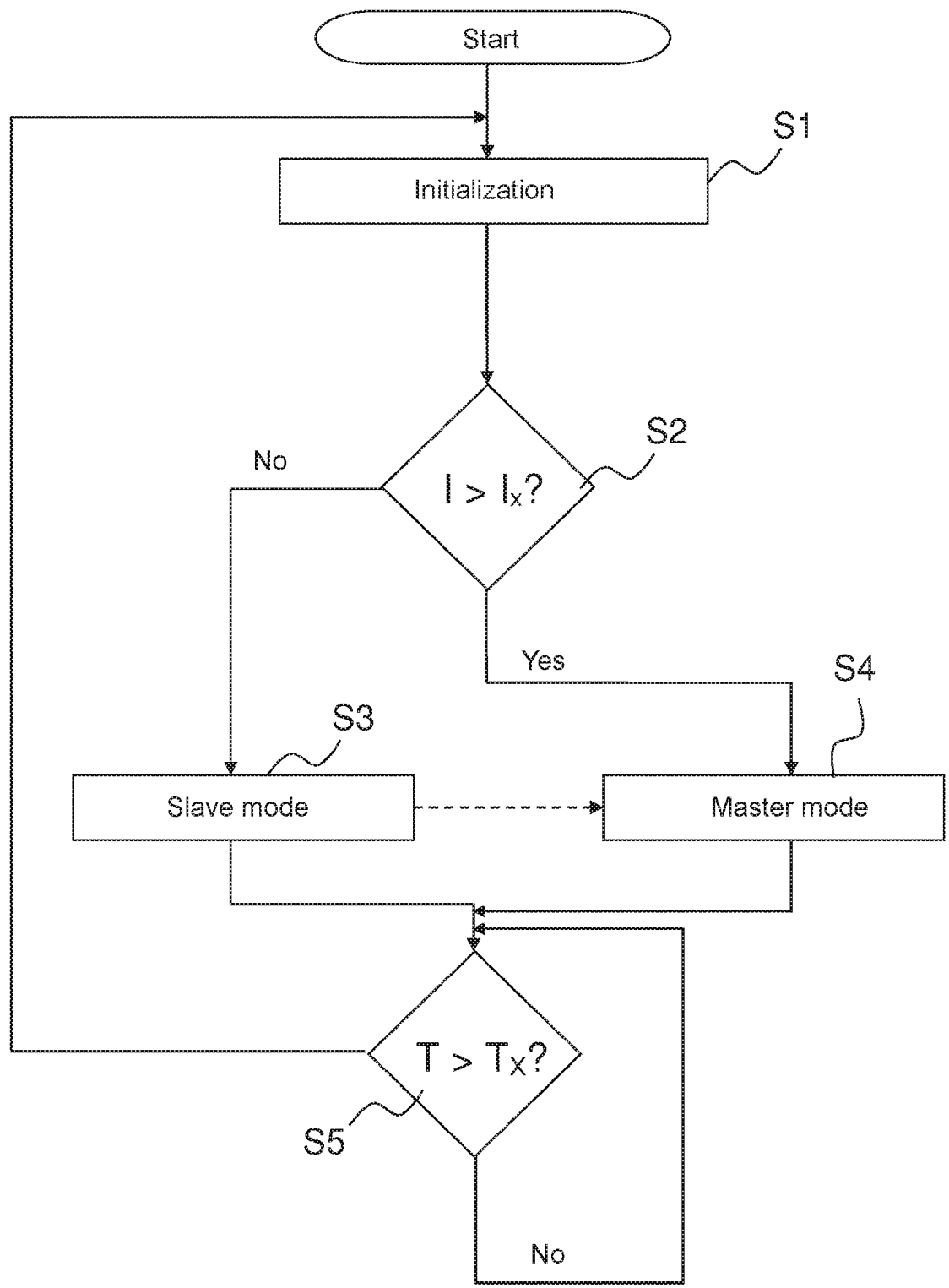
FIG. 4 shows an exemplary flow chart for a process according to the invention for operating a voltage supply system.

An exemplary embodiment of a process flow chart for a process according to the invention for operating a voltage supply system C is described in FIG. 4. The voltage supply system C is constructed like that in FIG. 3, by way of example, and comprises at least two supply units 1, 1'.

An initialization phase of the process according to the invention is initiated in step S1. The initialization phase is explained in greater detail in reference to FIG. 5. A simultaneous switching of the bypass switch 5 to the first switching state I by two supply units 1, 1' is prevented in particular in phase S1.

Following the initialization phase, a first current draw detection phase S2 takes place. This current draw detection phase S2 is explained in greater detail in reference to FIG. 6.

The result of the current draw detection phase S2 is a comparison result, showing how much greater the detected current draw from the bus 3 is than a predefined value $I_x$ for a maximum current draw, e.g. the maximum acceptable current of 240 milliamperes in the operation of a lighting system A in accordance with the DALI standard. If the current draw is greater than the predefined value $I_x$ in the lighting system ("yes" case), then the master mode operation S4 is initiated. In the "no" case, the slave mode operation S3 is initiated for the respective supply unit 1. Subsequently to the slave mode of operation S3 or the master mode of operation S4, a time period check S5 takes place, in which it is checked whether the bypass switch 5 of one of the supply units 1, 1' is switched to the switching state I for more than a maximum acceptable time $T_x$. If this is the case, the process begins anew. If this is not the case, the operation continues to run as it is.

The process according to FIG. 4 is preferably completed before completion of a start-up procedure waiting period of 600 milliseconds. Thus, prior to completion of a stabilization of the DALI bus 3, a quasi-communication between the supply units 1 is created, and a stable operation of the lighting system 1 is ensured.

Figure 5:
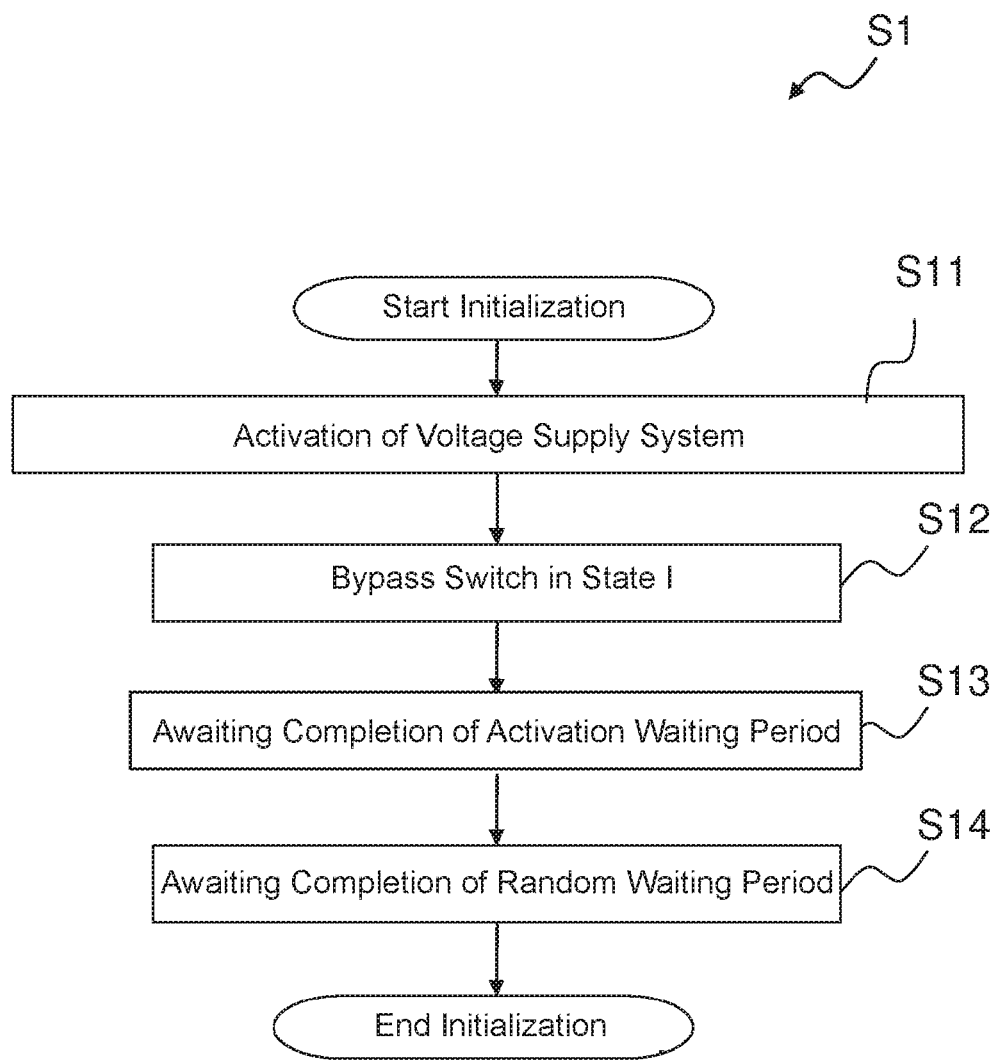
FIG. 5 shows an exemplary flow chart of an initializing phase of the process according to the invention pursuant to FIG. 4.

The initialization phase S1 of the process according to the invention according to FIG. 4 is illustrated in detail in FIG. 5. For this, the voltage supply system A is first activated in step S11. The bypass switch 5 is then switched to the first switching state I in step S12. The bus supply line DA+ is connected in this manner to the bus supply line DA−. Subsequently, completion of an activation waiting period $T_{Einschalt}$ is waited for in step S13. This is necessary to ensure that the supply unit 1 is in stable operation for a correct detection of the current draw by the control unit 4. In the subsequent step S14, the supply unit 1 waits for the completion of a random waiting period $T_{Zufall}$. This random waiting period $T_{Zufall}$ is different for each supply unit in the voltage supply system C, thus preventing simultaneous current draw detection by two different supply units 1. In this manner, the detection of a misleading current draw by another supply unit 1 is prevented.

Figure 6:
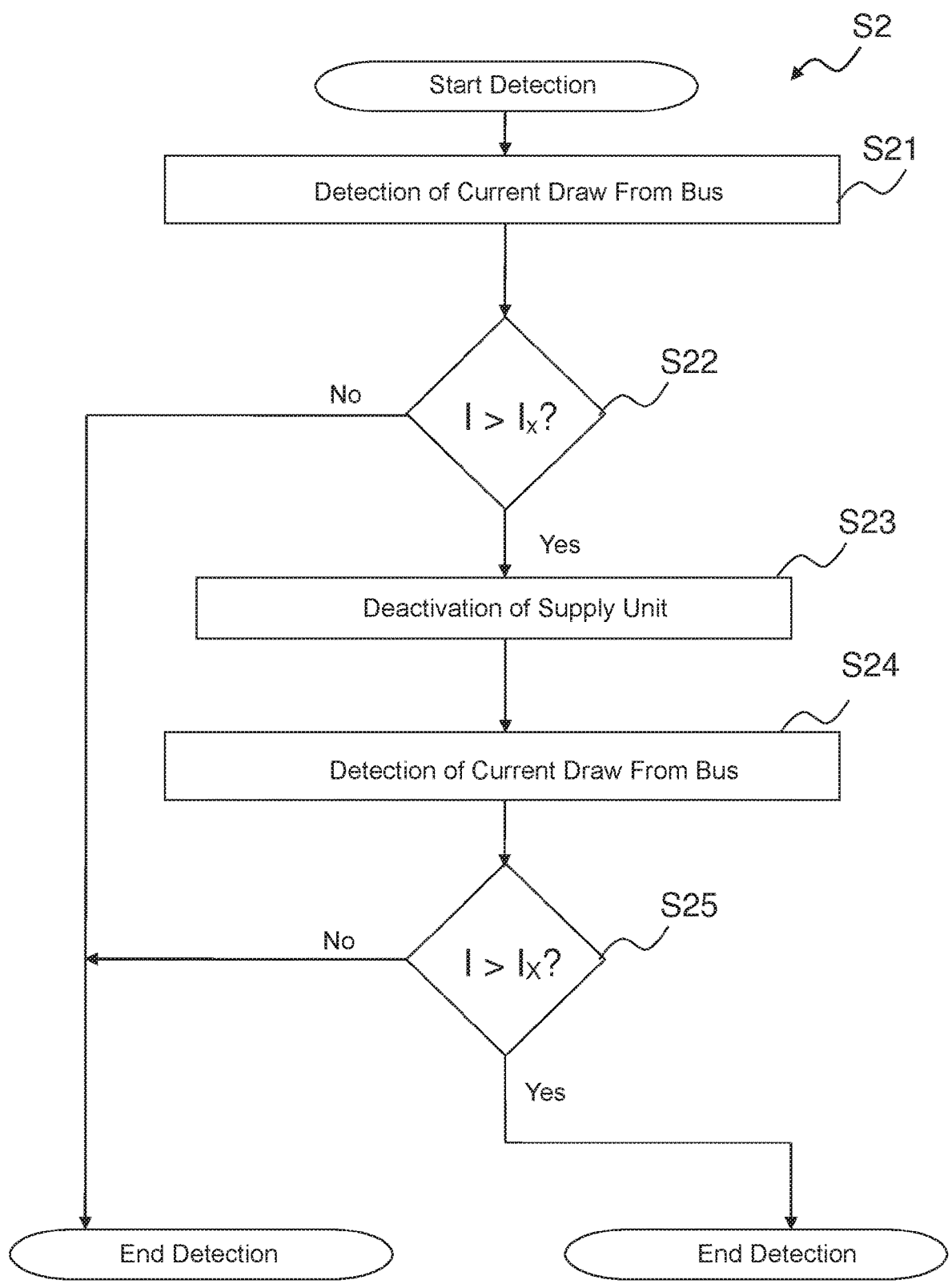
FIG. 6 shows an exemplary flow chart for a first current draw detection phase of the process according to the invention pursuant to FIG. 4.

A first current draw detection phase S2 according to FIG. 4 is shown in FIG. 6. For this, a current draw from the bus 3 is detected in step S21. The bypass switch 5 remains activated for this (see initialization phase S1). The control unit 4 detects the current draw through the measuring element 6. In the subsequent step S22, a comparison is made between the current draw and a predefined value $I_x$ for the maximum current draw by the control unit 4. If the detected current draw I is less than or equal to the predefined value $I_x$, the first current draw detection phase S2 is completed.

If the detected current draw I is greater than the predefined value $I_x$, the supply unit 1 is deactivated in step S23. The current draw from the bus 3 is subsequently detected again in step S24. Following this, a comparison S25 takes place again, corresponding to the previous comparison S22. If the detected current draw I is less than or equal to the predefined value $I_x$, the supply unit 1 is operated in the slave mode of operation S3, and the detection phase S2 is completed. If the detected current draw I is greater than the predefined value $I_x$, the first current draw detection phase S2 is completed, but the supply unit 1 is operated in the master mode S4.

Figure 7:
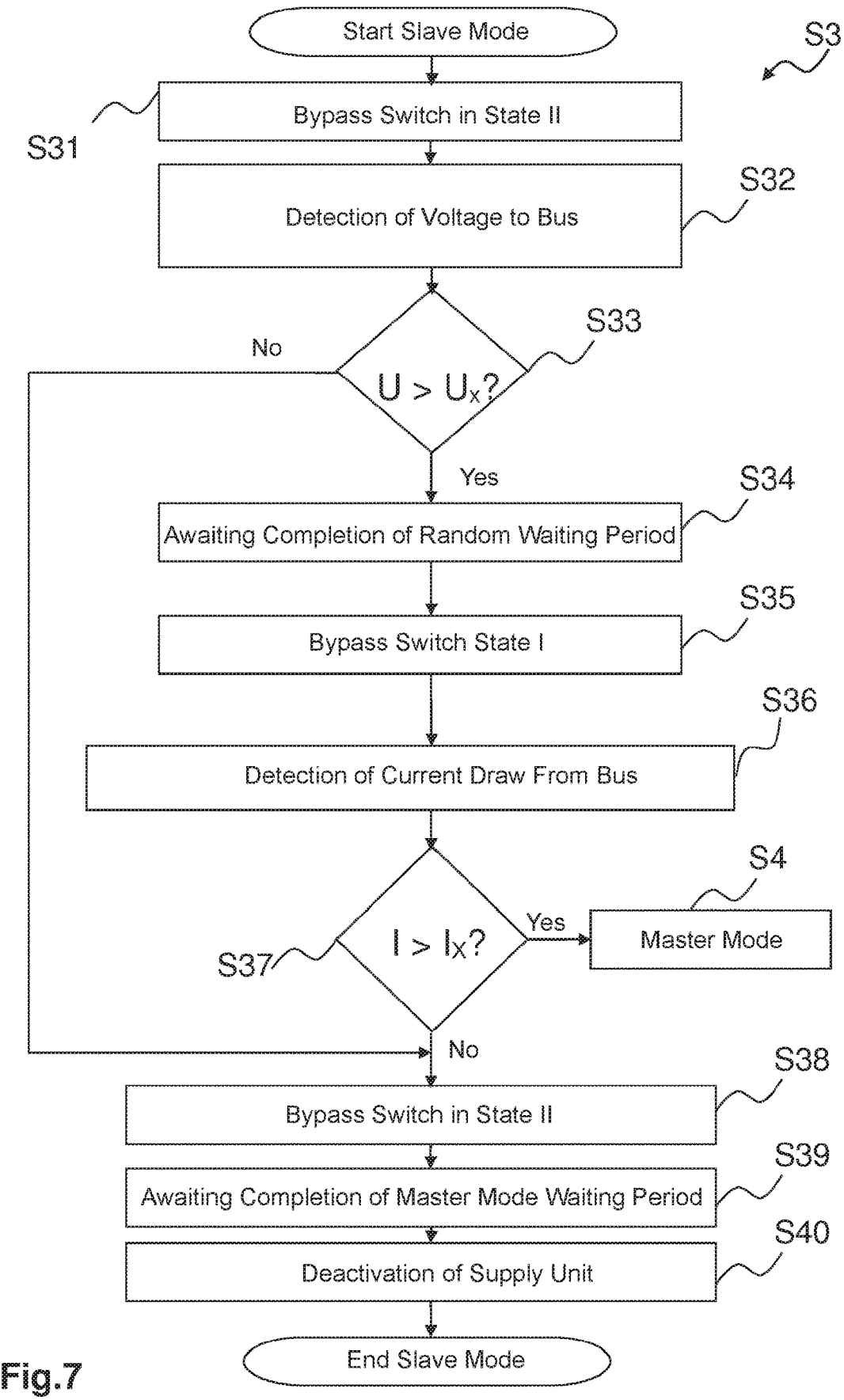
FIG. 7 shows an exemplary flow chart for a slave mode of operation for the process according to the invention pursuant to FIG. 4.

The slave mode of operation S3 according to FIG. 4 is described in greater detail in FIG. 7. The slave mode of operation S3 is activated when the current draw detected in step S25 or step S22 is less than the predefined value $I_x$. The bypass switch 5 is then deactivated in step S31 in that it is switched to the switching state II. The DA+ line of the bus 3 is thus disconnected from the DA− line of the bus 3. The detection of a voltage U of the bus 3 then takes place in step S32. If a comparison S33 shows that the voltage is lower than a reference voltage $U_x$, e.g. 9 V, it is assumed that there is no other supply unit 1 in the voltage supply system C. If the comparison shows that the voltage is higher than 9 V, for example, then completion of a random period $T_{Zufall}$ is waited for in step S34. The bypass switch 5 is then switched back to the activated state I (see step S35). The current draw from the bus 3 is again detected in accordance with steps S36 and S37. The detected current draw is again compared here with the value $I_x$, wherein if it falls below the value $I_x$, a switching to the master mode takes place in accordance with S4.

If the current draw is less than the value $I_x$, it is assumed that no other supply unit 1 is active in the voltage supply system C, and the bypass switch 5 can be switched back to state II in accordance with step S38. After waiting for completion of a master mode waiting period $T_{Master}$ in step S39, the supply unit 1 is switched off (see step S40). The slave mode S3 is then terminated.

Figure 8:
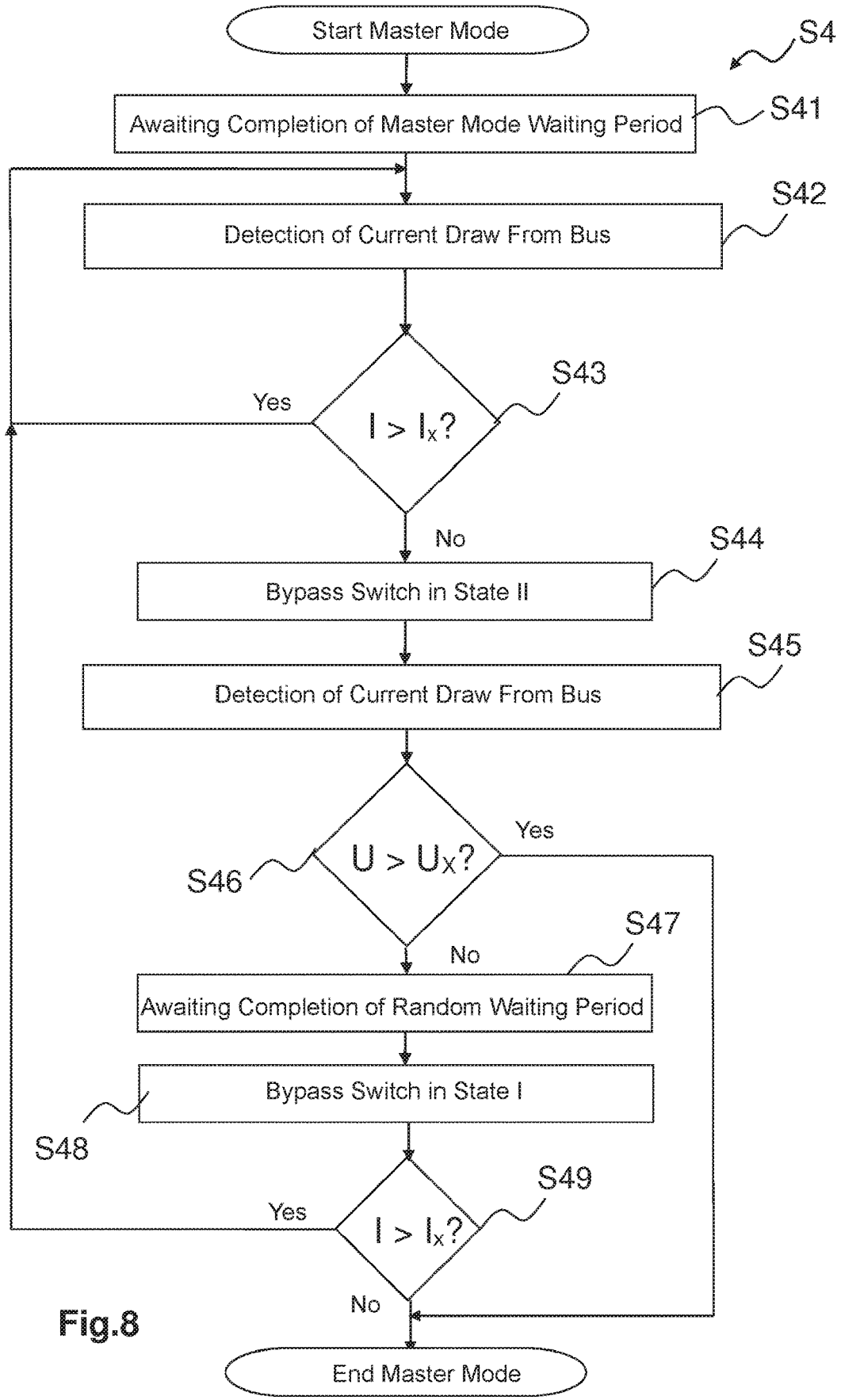
FIG. 8 shows an exemplary flow chart of a master mode of operation for the process according to the invention pursuant to FIG. 4.

The master mode of operation S4 according to FIG. 4 is shown in greater detail in FIG. 8. First, completion of a master mode waiting period $T_{Master}$ is waited for in step S41. Subsequently, detection of the current draw takes place in steps S42 and S43. In this manner, it is determined whether the current draw lies below the value $I_x$. Moreover, each supply unit 1 terminates the slave mode S3 in this phase, because a current draw has been detected that is higher than the value $I_x$, and the current draw from the bus 3 must thus be reduced.

As soon as the current draw is less than the value $I_x$, the bypass switch 5 is switched to the deactivated state I in accordance with step S44. This is followed by the detection of the voltage to the bus 3 in accordance with steps S45 and S46, in a manner similar to that in steps S33 and S32. If the voltage is greater than a reference voltage $U_x$, it is assumed that there is only one master supply unit 1 in the lighting system A, and this assumes the role of the main supply. If it has been determined in step S46 that the voltage is lower than the reference voltage $U_x$, then there are other supply units 1, 1' running in the master mode in the lighting system 1. Completion of a random waiting period $T_{Zufall}$ is then waited for (S47), and the bypass switch 8 is switched back to the switching state I in accordance with step S48. A current draw detection is repeated in step S49. If the current draw is greater than the value $I_x$, the master mode in accordance with step S4 is reinstated.

With the process steps described in FIGS. 4 to 8, it is ensured that the maximum current draw never exceeds a value $I_x$, and the lighting system A can be adapted to its respective clustering B, B', B".

All of the features that are shown, depicted, or claimed herein can be combined arbitrarily with one another.

What is claimed is:

1. A bus subscriber (BT1), that can be connected to a building technology bus, comprising:
a supply unit, and
a control unit,
wherein the supply unit is configured to output a measurement current ($I_M$) and an operating current ($I_B$) to the building technology bus, and wherein the control unit is configured to detect and evaluate a bus current ($I_{BUS}$) on the building technology bus during a test phase, and to determine on the basis of the evaluation whether to activate the supply unit to output the operating current ($I_B$) to the building technology bus after the test phase, or deactivate the supply unit so that the supply unit does not output the operating current ($I_B$) after the test phase.

2. The bus subscriber (BT1) according to claim 1, wherein the control unit is configured to determine the number (N) of bus subscribers connected to the building technology bus on the basis of the detected bus current ($I_{BUS}$), and to determine whether a total bus current that can be output by the determined number (N) of bus subscribers lies within a bus specification; the control unit is further configured to activate the supply unit, after the test phase, in order to output an operating current ($I_B$) to the building technology bus when the total bus current that can be output by the determined number (N) of bus subscribers lies within a bus specification and deactivate the current output to the building technology bus by the supply unit when the total bus current that can be output by the determined number (N) of bus subscribers exceeds the bus specification.

3. The bus subscriber (BT1) according to claim 2, wherein the control unit is configured to determine whether the total bus current that can be output by the determined number (N)

of bus subscribers exceeds a threshold value in the range of 150-300 milliamperes, wherein the bus specification comprises the threshold value.

4. The bus subscriber (BT1) according to claim 1, wherein the control unit is configured to receive and evaluate a specific bus signal transmitted over the building technology bus and to initiate the test phase after receiving the specific bus signal, and in particular to activate the supply unit to output the measurement current ($I_M$).

5. The bus subscriber (BT1) according to claim 1, wherein the control unit is configured to detect the bus current ($I_{BUS}$) at a random point in time ($t_{Rand}$), within the test phase.

6. A lamp that has a bus subscriber (BT1) according to claim 1.

7. A bus system for building technology devices, comprising:
    a DALI building technology bus; and
    at least two bus subscribers (BT1, BT2) which are connected to the building technology bus and which each have a DALI supply unit, wherein the supply units are operated independently, and wherein each of the bus subscribers is configured to output a measurement current ($I_M$) to the building technology bus generated by the respective supply unit, and wherein the at least two bus subscribers (BT1, BT2) are connected to the DALI building technology bus such that the measurement currents ($I_M$) are added to one another;
    wherein the bus subscribers (BT1, BT2) each have a control unit, which is configured to detect and evaluate a bus current ($I_{BUS}$) to the building technology bus, in a test phase, and to determine a number (N) of bus subscribers (BT1, BT2) connected to the building technology bus on the basis of the detected bus current ($I_{BUS}$); and
    wherein each control unit is configured to determine, on the basis of the determined number (N) of bus subscribers, whether a threshold value for a total bus current has been exceeded, when the determined number (N) of bus subscribers (BT1, BT2) outputs an operating current ($I_B$) to the building technology bus instead of the measurement current ($I_M$).

8. The bus system according to claim 7, wherein each control unit is configured to deactivate a current output to the building technology bus by the supply unit when the threshold value has been exceeded.

9. The bus system according to claim 7, wherein the bus system does not have a central current supply.

10. The bus system according to claim 7, wherein the threshold value for an acceptable total bus current is defined in the range of 150-300 milliamperes.

11. The bus system according to claim 9, wherein the independently operable decentralized supply units of the at least two bus subscribers (BT1, BT2) provide the total bus current.

12. A process for operating a building technology bus, wherein multiple bus subscribers (BT1, BT2) are connected to the building technology bus and each of said bus subscribers has a supply unit, wherein the supply units are operated independently of one another, and each of said bus subscribers (BT1, BT2) outputs a measurement current ($I_M$) generated by the respective supply unit to the building technology bus, and said multiple bus subscribers (BT1, BT2) are connected to the building technology bus such that the measurement currents are added together, the process comprising the steps of:
    outputting a measurement current ($I_M$) from each supply unit to the building technology bus during a test phase;
    using one of the control units to detect and evaluate the bus current ($I_{BUS}$) supplied to the building technology bus during the test phase;
    determining the number (N) of bus subscribers with supply units connected to the building technology bus on the basis of the detected bus current ($I_{BUS}$);
    determining whether a total bus current that can be output by the determined number (N) of bus subscribers lies within a bus specification if the determined number of bus subscribers output in each case an operating current ($I_B$) to the building technology bus instead of the measurement current ($I_M$).

* * * * *